United States Patent [19]

Knorre

[11] 3,730,757

[45] May 1, 1973

[54] PROCESS FOR ADHESIVE VARNISHING, PRINTING AND GLUING OF PLASTICS

[75] Inventor: Helmut Knorre, Seligenstadt, Germany

[73] Assignee: Deutsche Gold- Und Silber-Scheideanstalt vormals Roessler, Frankfurt am Main, Germany

[22] Filed: May 25, 1971

[21] Appl. No.: 145,975

Related U.S. Application Data

[63] Continuation-in-part of Ser. No. 762,635, Sept. 25, 1968, abandoned.

[52] U.S. Cl................117/47 A, 117/12, 117/36.1, 117/138.8 A, 117/138.8 E, 260/37, 260/876
[51] Int. Cl............................B44d 1/094, B44d 5/12
[58] Field of Search..........................117/47, 12, 36.1, 117/138.8 A, 138.8 E; 260/37, 876

[56] References Cited

UNITED STATES PATENTS

| | | | |
|---|---|---|---|
| 3,091,553 | 5/1963 | Matsumoto | 117/138.8 E |
| 2,971,858 | 2/1961 | DeGiulio | 117/12 |
| 2,998,324 | 8/1961 | Hirt | 117/138.8 E |
| 2,790,727 | 4/1957 | Hilborn | 117/12 |
| 3,573,957 | 4/1971 | Findlay et al. | 117/47 |

*Primary Examiner*—William D. Martin
*Assistant Examiner*—William R. Trenor
*Attorney*—Beveridge & DeGrandi

[57] ABSTRACT

The receptivity of thermoplastics, for example, polyethylene and polypropylene, to coatings is improved by incorporating into the thermoplastic a finely divided, particulate inorganic filler and an organic resin having a softening point lower than the thermoplastic, a softening range of about 30° to 100° C and capable of being degraded by conventional oxidizing pretreatment.

9 Claims, No Drawings

PROCESS FOR ADHESIVE VARNISHING, PRINTING AND GLUING OF PLASTICS

CROSS-REFERENCES

This application is a continuation-in-part of copending application Ser. No. 762,635 filed Sept. 25, 1968, now abandoned.

THE INVENTION

This invention concerns a process for the solid adhesive varnishing, printing and gluing of plastics, especially of the thermoplastic type, through pretreatment to change the surface of plastic (A), whereby the basis for the adhesive fastening is created through a specific preliminary preparation of the plastic. More particularly, this invention relates to an improvement in the process for coating a thermoplastic resin (A) with adhesives, dyes, inks, varnishes and the like in which the receptivity of the thermoplastic resin (A) to the coating is increased by an oxidizing pretreatment.

Plastics, such as those of the polyolefin type may be varnished, printed upon and/or glued to a substrate using conventional coating techniques which merely provide for the application of the varnish etc. to the surface of the article. Unfortunately the adhesive strength of such coatings are often very low and more often too low to be acceptable for their intended purpose. In order to remedy this situation, the prior art has generally sought to increase surface adhesion of the plastic to the coating by modifying the surface of the plastic in a manner such that mechanical fastening of the varnish etc. to the plastic can take place.

Many different ways have been devised to modify the surfaces of plastics to make them more readily varnished, printed upon etc. Not all of these attempts have been successful, but a few of them present the art with a start toward the achievement of good results. For example, it is known to pretreat polyethylene, especially of the high pressure type, with a hot flame (oxidizing attack), so that the surface of the plastic is modified to more readily accept varnish, glue, ink and the like. While this flame technique gives rise to some improved adhesion it is rather clumsy and in a large number of instances, such as where one is dealing with precisely molded bodies (e.g. sprayed die castings) flame treatment can not be employed.

Similar drawbacks and problems arise with respect to the other known processes such as where the plastic surface is modified by attack with ozone, electron beams, nitrous gases, and the like. Other known processes, such as where the surface of the plastic is oxidized by wet-chemical techniques, usually do not lead to sufficient increases in adhesive strengths.

From the above it is apparent that there exists a need in the art for a technique which will overcome the abovedescribed problems and at the same time result in high adhesive strengths. This invention fulfills this need in the art.

Generally speaking, this invention fulfills the above-described need in the art by incorporating into a thermoplastic resin (A), such as a polyolefin resin, a finely divided, particulate inorganic filler (B) and an organic resin (C) different from resin (A). Resin (C) is chosen such that it has a softening point lower than that of resin (A), a softening range of about 30°–100°C and is capable of undergoing degradation by oxidizing pretreatment. The resulting mixture of (A), (B), and (C) when subjected to an oxidizing pretreatment is capable of strongly adhering to a coating of adhesive, dye, ink, varnish and the like.

Other objects, features and advantages of this invention will be apparent to those skilled in the art from the description of the invention which follows.

One of the concepts which forms a basis for this invention consists of the fact, that the plastic substrate to be varnished and/or to be printed on and/or to be glued, is first filled with a filler which, on the one hand, does not exert too negative an influence on the mechanical characteristics of the plastic, and which, on the other hand, will bring about, while having a correspondingly high degree of filling, the roughness of the plastic surface required for solid adhesive fastening, or else, which through suitable pretreatment of the filled plastic with acids, lyes or other agents contributes to the conditioning of the plastic surface.

While this invention relies upon the above-described filling concept to aid in obtaining increased adhesion, filling alone is not enough. A relatively high degree of filling is usually required, particularly in the case of sprayed die castings, in order to achieve a sufficient penetration of the plastic surface with filler and thus a sufficient conditioning of the plastic, in order to obtain the desired amount of adhesion strength. This high degree of filling is normally achieved only with difficulty and in most cases causes such embrittlement of the plastic as to severely limit the use to which the product may be put. On the other hand, if the degree of filling is lowered to reduce embrittlement, pretreatment of the filled plastic such as by oxidation with strongly oxidizing substances (e.g. chromosulfuric acid), will be effective only if used for lengthy periods of time sufficient to remove the plastic skin that covers the filler. Such lengthy times mean additional expenses and are thus undesirable.

This invention, therefore, goes beyond mere plastic filling and includes the important feature that plastic (A) not only is provided with filler(s) (B), but in addition with one or more resins (C) preferably of the polymer, copolymer, and mixtures thereof, type. As stated above resin (C) is different than (A), has a lower softening point than (A), preferably has a softening range of about 30°–100°C, and is oxidizingly attacked in customary conditioning baths such as, and preferably, chromo-sulfuric acid. By providing such a substrated plastic of (A), (B) and (C), rapid oxidizing pretreatment can be effected to provide excellent adhesion with varnishes, printing materials and/or glues applied thereto by conventional techniques.

In selecting a resin (C) and in addition to the above-listed requirements, resin (C) should be compatible with resin (A) and aid in the working in of large and/or very voluminous quantities of filler (B) into the plastic. Preferably (C) is chosen to also provide the plastic object with easy finishing characteristics on customary finishing machines and provide for a faultless surface development. Thus through the special addition of resin (C), the working-in of large quantities of filler (B) into the plastic combination (A) and (C) and the finishing of these filled plastics into finished parts readily varnished, printed on and glued, is considerably facilitated. That is to say, the addition of resin (C) having the described softening point and being compatible with (A) causes on the one hand an increase in the ability of the plastic to accept more filler (B) which further increases adhesion and on the other hand retards embrittlement caused by filler (B) and betters the flow behavior of the plastic, normally worsened by large additions of filler (B). In this respect then this invention through the use of an additional resin (C) now allows a high degree of filler (B) to be used which not only increases mechanical adhesion factors but also improves the life of the adhesion bond by minimizing "cold-flow" and heat expansion characteristics.

The amount of resin (C) employed will vary depending upon the type system in which it is used etc. Generally speaking however resin (C) is employed in an amount of about 1–40 percent by weight and preferably 5–15 percent by weight, related to the weight of the plastic used.

Examples of resin (C) useful in this invention are polyvinyl acetate, polyisobutylene, ethylene vinyl acetate, copolymers of ethylene, propylene and of higher olefins, as well as of vinyl chloride, with vinyl acetate, isobutylene, acrylic acid esters, methacrylic acid esters, butadiene, acrylonitrile, or also corresponding polymer mixtures of polyethylene, polypropylene, higher polyolefins and polyvinyl chloride with polyvinyl acetate, polyisobutylene, polyacrylic acid esters, polyacrylonitrile and mixtures thereof.

Examples of polymers (A) which are useful in the present invention are those thermoplastic polymers whose surfaces are hydrophobic and unreceptive to coatings, such as adhesives, dyes, inks, varnishes and the like. From the commercial standpoint, the present invention is most useful in the treatment of polyolefinic resins, such as polyethylene, polypropylene, and higher polyolefinic materials. However, the invention is not limited to polyolefinic resins and other thermoplastic resins can be treated in accordance with this invention.

In a particularly preferred embodiment of this invention polymer (A) is a polyolefin such as polyethylene or polypropylene and polymer (C) is ethylene-vinyl acetate (especially for polypropylene) or polyisobutylene (especially for polyethylene). When these preferred specific combinations are employed all of the above-described desired results are achieved.

The working in of the additives (B) and (C) into the plastic (A) is accomplished most preferably by the initial formation of a mixture of filler (B) with previously mentioned resin (C) and the addition of this mixture, thereafter to (A). One can however, also proceed such that the plastic (A) is mixed first with additions of resin (C) with subsequent working in of filler (B). Because resin (C) is chosen to facilitate acceptance of (B), B is preferably not added, at least in its entirety to (A) alone. Instead of the combination (mixture) of plastic (A) with the polymers, copolymers and/or mixtures thereof (C) and fillers (B), it is also possible to build within the sense of this invention copolymerizates made of (A) with portions of the polymer (C) and fillers (B). Additionally, the possibility exists to crosslink the plastic (A) and/or the polymer additions (C).

Inorganic, finely distributed substances with a secondary particle size between 0.1 and 150μ, preferably 0.2 to 20μ, have proven themselves particularly useful as fillers (B). Particularly preferred are finely distributed, precipitated or pyrogenously obtained metal and/or metalloid oxides preferably in the form of uniform oxides, as mixed oxides or mixtures of oxides, alkali and/or earth alkaline oxides and/or aluminosilicates.

By the term precipitated fillers is meant all fillers produced in the wet process, for example from alkali silicate solutions with acids or acid salt solutions. An example of such a filler is Durosil which is a precipitated silicate of about 85% $SiO_2$. Another example is HK 125, a precipitated silicate containing greater than 93% by weight $SiO_2$. The pyrogenic fillers are obtained from their volatile compounds by oxidation or hydrolysis in a flame. An example is Aerosil TT 600 a pyrogenic compound of greater than 99.8% $SiO_2$. In the case of flame hydrolysis, a homogeneous mixture consisting for example of a volatilizable, metal halide in the steam phase with a gas, oxygen or air, and possibly an inert gas, forming water during the combination, is converted in a flame to the oxide and hydrogen chloride. By mixing various metal halides and by supplying the homogeneous mixture in the steam phase to a burner, so-called "mixed oxides" can be produced, in the case of which every individual primary particle already consists of the oxides. The common coagulation of oxide aerosols produced separately results in inseparable "oxide mixtures" of the "co-coagulate" type. However, it is also possible to mechanically mix with one another the oxide aerogels obtained separately, so that "mixtures of oxides" separable from one another will be obtained. One can likewise use as fillers, alkali and/or alkaline earth and/or aluminum silicates, furthermore natural silicates, corundum powder and other natural, finely distributed mineral substances which can be put in an active state by means of a pretreatment, for example, with hot soda lye. Further specific examples of fillers which may be employed include particulate $SiO_2$, $TiO_2$, calcium silicate, and aluminum silicate having the above-described particle sizes. Commercially pure particulate $SiO_2$ is obtainable under the trademark TK 800 and is obtained by electric arc techniques. Commercially available particulate aluminum silicate is available under the trademark Pasilex. All trademarked examples above are by DeGussa of Frankfurt, Germany.

The amount of filler employed will of course vary greatly depending upon the system in which it will be employed. Generally speaking, however, the amount of filler employed usually amounts to about 5–70 percent by weight of the plastic content of the composition.

The plastics prepared with the preferred fillers hereinabove described may be easily pretreated for good adhesion by merely dipping them in conventional chromosulfuric acid baths in order to be simultaneously defatted, hydrophiled and conditioned.

In a particularly preferred manner of formulating the products of this invention plastic (A) which is to be varnished, printed on and/or glued usually is mixed as a granulate and/or powder in mixers customary for the finishing of plastics, with corresponding portions of the polymer addition (C) and the filler (B), for example, at the weight ratio of 70 : 10 : 20.

For further homogenization and/or plastification, this mixture usually is treated, for example, in a heated punch kneader, rolling mill, or an extruder, preferably at 140° to 200°C. Prior to the finishing into semi-finished goods or finished parts, this mixture is, for practical purposes, put into the shape of granulates or agglomerates.

The semi-finished and finished parts, produced on the customary finishing machines, subsequently are conditioned for adhesive varnishing, printing-on or glued by oxidizing pretreatment. Any conventional oxidizing pretreatment can be employed. However a preferred technique is to submerge the articles for about 10 minutes in a 60°C, alkaline defatting bath and, after rinsing with water, dipping the articles for about 5 to 15 minutes in a chromosulfuric acid of 60°C. After repeated thorough rinsing with water and drying, the parts can be varnished, printed on or glued in the customary manner.

While not wishing to be limited to any particular theory, it is believed that enhanced adhesion occurs in the products of this invention for several reasons. Firstly, because resin (C) by its softening points and compatibility aids in the acceptance and tolerance of filler (B) into the system, more filler (B) can be employed. This increases adhesion by increasing the roughness of the plastic surface and increasing exposure of the filler at the surface caused by oxidation. Secondly, because resin (C) is degradable during oxidation more exposure of filler and more roughening of the plastic surface takes place. That is to say when resin (C) degrades during oxidation, it not only exposes filler which would otherwise remain covered by a plastic skin of resin (A), but it also pits and roughens the surface of the plastic as it, itself, is degraded.

The quality of adhesive strength of the varnish or printing ink can be tested most simply by the customary "Tesa film" test. Furthermore, the lattice cut test is a proof of good adhesion and also the Erichson test. For the gluing one can use the "peeling" test in order to obtain a clue for the quality of the adhesive strength. As stated hereinabove, the adhesive strengths of this invention are enhanced while the economics of simple techniques are maintained.

EXAMPLE 70 parts by weight of polyethylene having an average molecular weight of 25,000 are thoroughly blended with 10 parts by weight of finely divided silica having a secondary particle size of $10\mu$ and 20 parts by weight of polyvinyl acetate having a softening point of 60°C. The mixture is blended in a rolling mill at a temperature of 160°C and then rolled into sheet form. The sheets are submerged in a chromo-sulfuric acid bath for 10 minutes at a temperature of 60°C. After rinsing the treated sheets with water and drying, a design is printed onto the sheets using conventional printing ink. By the Tesa film test, it is determined that the ink tenaciously adheres to the modified polyethylene.

What is claimed is:

1. A process for improving the receptivity of a polyolefinic resin (A) to coatings, comprising:
   incorporating into said polyolefinic resin (A) a mixture of a finely divided, particulate, inorganic filler (B), and an organic resin (C) different from said polyolefinic resin (A), said organic resin (C) having a softening point lower than said polyolefinic resin (A), said organic resin (C) having a softening point within the range of about 30° – 100°C., and oxidizing a surface comprising said polyolefinic resin (A), said inorganic filler (B) and said organic resin (C), to degrade said organic resin (C) and to expose filler (B), whereby the receptivity of the polyolefinic resin (A) to said coatings is enhanced.

2. The process as defined in claim 1 in which said organic resin (C) is selected from polyvinyl acetate; polyisobutylene; ethylene-vinyl acetate, copolymers of ethylene, propylene, higher olefins, vinyl chloride with vinyl acetate, isobutylene, acrylic acid esters, methacrylic acid esters, butadiene; mixtures of polyethylene, polypropylene, higher polyolefins, polyvinyl chloride with polyvinyl acetate, polyisobutylene, polyacrylic acid esters polyacrylonitrile, and mixtures thereof.

3. The process as defined in claim 1 wherein 1 to 40 percent by weight of organic resin (C), based on the weight of said polyolefinic resin, is incorporated into said polyolefinic resin.

4. The process as defined in claim 1 wherein said polyolefinic resin (A) is polyethylene and said organic resin (C) is polyisobutylene.

5. The process of claim 1 wherein said polyolefinic resin (A) is polypropylene and said organic resin (C) is ethylene vinyl acetate.

6. The process as defined in claim 1 wherein the filler (B) has a secondary particle size of between 0.1 and 150.

7. The process as defined in claim 6 wherein from 5 to 70 percent by weight of filler (B), based on the weight of said polyolefinic resin, is incorporated into said polyolefinic resin.

8. The process as defined in claim 6 wherein the filler (B) is one or more finely divided metal or metalloid oxides.

9. The process as defined in claim 8 wherein said filler is an alkali metal oxide, an alkaline earth metal oxide, an alumino silicate, or mixtures thereof.

* * * * *